UNITED STATES PATENT OFFICE.

THOMAS F. WILKINS, OF LONDON, ENGLAND.

PRESERVATION OF BUTTER.

SPECIFICATION forming part of Letters Patent No. 226,467, dated April 13, 1880.

Application filed December 3, 1879. Patented in England June 23, 1879.

*To all whom it may concern:*

Be it known that I, THOMAS FOSTER WILKINS, of Upper Baker street, London, in the county of Middlesex and Kingdom of England, have invented certain new and useful Improvements in the Preservation of Butter, which are fully set forth in the following specification.

This invention relates to the preservation of butter by means of glacial metaphosphoric acid.

In carrying out my invention I take of glacial metaphosphoric acid in solution, say, twenty-four grains of acid for every pound of butter. This solution I thoroughly mix, blend, and incorporate with the butter by any suitable means. The preservative process is then complete, and the butter thus prepared may be placed in any suitable vessel for domestic or commercial purposes.

Instead of applying the glacial metaphosphoric acid in solution, I may apply it in a solid crushed state.

The strength of the solution will vary according to circumstances and requirement—say from three drams to one ounce to the ounce of water.

I would observe that it is preferable that the butter should be treated with the preservative agent as soon after it is taken from the churn as possible, and that the butter be thoroughly freed from buttermilk; also that the flavor will be improved by the addition of a small quantity of salt.

Having now described the nature of my invention and in what manner the same is or may be performed, I would have it distinctly understood that I do not confine myself to the relative proportions hereinbefore given, as such may be varied to suit various kinds of butter, the length of time for which it is desired to preserve the butter, the atmospheric conditions under which it is prepared, and other causes. The proportion of the preservative agent will not, however, in any case exceed one dram to one pound of butter.

I am aware that phosphates and phosphites have been long known as antiseptics, and also that metaphosphoric acid in solution has been proposed as a preservative for fish, vegetables, and fruits, and for hardening fats by being melted therewith. Such I do not claim as my invention, nor would such means or methods be applicable to the preservation of butter.

The mechanical admixture of the metaphosphoric acid with the butter, as carried out in practicing my invention effects the preservation of the butter by bringing the reagent in contact with the caseine and other substances which would otherwise putrefy.

I claim as my invention—

As a new article of manufacture, butter containing metaphosphoric acid intimately incorporated therewith, whereby the butter is preserved, substantially as set forth.

THOMAS FOSTER WILKINS.

Witnesses:
WILLIAM EDWARD GEDGE,
JOHN FOSTER LENNOX SYKES.